(12) United States Patent
Girouard et al.

(10) Patent No.: US 7,813,482 B2
(45) Date of Patent: Oct. 12, 2010

(54) INTERNET TELEPHONE VOICE MAIL MANAGEMENT

(75) Inventors: Janice M. Girouard, Austin, TX (US);
Dustin Kirkland, Austin, TX (US);
Emily J. Ratliff, Austin, TX (US);
Kimberly D. Simon, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1338 days.

(21) Appl. No.: 11/301,105

(22) Filed: Dec. 12, 2005

(65) Prior Publication Data

US 2007/0133757 A1    Jun. 14, 2007

(51) Int. Cl.
*H04M 1/64* (2006.01)
(52) U.S. Cl. .................. 379/88.09; 379/88.25; 455/413
(58) Field of Classification Search .............. 379/88.09, 379/88.23–88.25
See application file for complete search history.

(56) References Cited

U.S. PATENT DOCUMENTS

| 6,006,185 A * | 12/1999 | Immarco .................... 704/251 |
| 7,051,077 B2 * | 5/2006 | Lin ............................ 709/207 |
| 7,224,778 B2 * | 5/2007 | Aoki ........................ 379/88.23 |
| 7,577,993 B2 * | 8/2009 | Roychowdhary et al. ...... 726/22 |
| 2005/0015452 A1 * | 1/2005 | Corson ....................... 709/206 |
| 2005/0201362 A1 | 9/2005 | Klein et al. |
| 2006/0031318 A1 * | 2/2006 | Gellens ...................... 709/206 |

OTHER PUBLICATIONS

VoIP tools firm ready to battle "SPIT", (Ziff Davis Publishing Holdings Inc.), 3 pages, [online], [accessed Jun. 28, 2005]. Retrieved from the internet <URL: http://www.windowsfordevices.com/news/NS7914600341.html>.
Qoyia has unmarched technical depth, (Qovia, Inc.), 3 pages, [online], [accessed Jun. 28, 2005]. Retrieved from the internet <URL: http://www.qovia.com/resources/white_papers.htm>.
Ranum, Marcus, Viagra over IP?, 2004, (Tech Target), 2 pages, [online], [accessed Jun. 29, 2005]. Retrieved from the internet <URL: http://www.infosecuritymag.techtarget.com/ss/0,295796,sid6_iss486_art995,00.html>.
Reid, R. Pierce, Voice spam spam, spamity spam, 4 pages [online], [accessed Jul. 27, 2005], Retrieved from the internet <URL: http://www.qovia.com/resources/pdfs/white%20papers/qovia_spit_wpaper.doc>.
Via Voice, (International Business Machines Corporation), 3 pages, [online], [accessed Jun. 29, 2005]. Retrieved from the internet<URL: http://www306.ibm.com/software/voice/viavoice/support/faqs/ipaq_mobility.html>.

(Continued)

*Primary Examiner*—Simon Sing
(74) *Attorney, Agent, or Firm*—Matthew W. Baca; Amy J. Pattillo (57) ABSTRACT

A method, system, and program provide for voice mail management. A voice mail filtering controller calculates a separate Bayesian score for each voice mail message from among multiple voice mail message entries received into a voice mailbox for a user, wherein each separate Bayesian score indicates a probability that the associated voice mail message is unwanted by said user. During playback, the voice mail filtering controller automatically deletes a selection of the voice mail messages each with a separate Bayesian score greater than a particular Bayesian score of the last played voice mail message from the voice mailbox.

20 Claims, 6 Drawing Sheets

OTHER PUBLICATIONS

Graham, Paul, A plan for spam, (Aug. 2002), 12 pages, [online], [accessed Jul. 27, 2005]. Retrieved from the internet <URL:// http://www.paulgraham.com/spam.html>.

Piscitello, David, IP Telephony security, part I: Threats to Subscribe, (MediaLive International, Inc.), 3 pages, [online], [accessed Jul. 27, 2005]. Retrieved from the internet <URL: http://loop.interop-comdex.com/comments.php?id=183_0_1_16_C1>.

Bayesian filtering, (2005 Wikipedia), 2 pages, [online], [accessed Jul. 27, 2005]. Retrieved from the internet <URL: http://en.wikipedia.org/w/index.php?title=Bayesian_filtering&printable=yes>.

Tyson, Jeff, How VoIP Works, (HowStuffWorks, Inc.), 11 pages, [online], [accessed Sep. 19, 2005]. Retrieved from the internet <http://computer.hotstuffworks.com/ip-telephony.htm/printable>.

* cited by examiner

INTERNET TELEPHONE VOICE MAIL MANAGEMENT

BACKGROUND OF THE INVENTION

1. Technical Field

The present invention relates in general to improved management of voice mail and in particular to automatically prioritizing voice mail messages and removing unwanted or unsolicited voice mail messages.

2. Description of the Related Art

The Internet has opened a variety of new ways for people to communicate with one another. For example, email services and instant messaging services facilitate communication by allowing users to send messages to one another; with email, messages are sent from mailbox to mailbox and with instant messaging, messages are sent in real-time from one user interface to another.

One limitation of communications facilitated via the Internet is the lack of regulation that leaves users open to receiving an influx of unwanted communications. Many users have experienced opening an email mailbox only to find a mailbox loaded with unsolicited and unwanted emails. This unsolicited and unwanted email is colloquially referred to as spam. In response to increasing amounts of spam, email service providers and third party developers continue to develop spam filtering tools that attempt to remove spam from email mailboxes, while leaving wanted emails.

Another type of communication facilitated by the Internet is Voice over Internet Protocol (IP), also referred to as VoIP, IP Telephony, Internet telephony or digital phone. VoIP refers to the routing of voice conversations over the Internet or other IP based networks. With VoIP, voice data flows over a general-purpose packet-switched network, instead of traditional dedicated, circuit-switched voice transmission lines. Protocols used to carry voice signals over the IP network are commonly referred to as VoIP protocols. Thus, VOIP enables a computer system communicatively connected to the Internet to function as a telephony device. As facilitated by a VoIP service provider or VoIP application software, through a computer system, a user can place a call to a telephone number or receive a call placed to a telephone number at the computer system.

In addition to providing VoIP voice service, VoIP service providers may also provide many of the same types of services that are now often included with or offered with standard wired and wireless telephone service. For example, just as normal telephony service providers provide voice mail systems, which facilitate a caller leaving a message for an intended recipient who is not available to receive the call and store the messages as voice mail messages in a voice mailbox, VoIP service providers may provide voice mail systems for storing voice mail messages left for a user.

While VoIP has many advantages, there are also disadvantages to VoIP. In particular one disadvantage of VoIP is that like email, VoIP provides a medium through which a telemarketer or other person can send multiple simultaneous messages, often untraced. Through a VoIP connection, a single caller can send out thousands of voice messages simultaneously into phones or voice mailboxes at little cost. Thus, the emergence of VoIP mailboxes provides a new target location for unwanted and unsolicited messages, in the form of VoIP voice mail messages. These unwanted and unsolicited VoIP voice mail messages are often colloquially referred to as spam over Internet Telephony (SPIT). Unlike spam that a user can view as entries and delete without reading, to identify and delete unwanted voice mail, however, with VoIP voice mail messages a user must first listen to the voice mail, identify the voice mail as unwanted, and then delete the voice mail. Further, unlike spam that may only use minimal storage space, VoIP voice mail messages typically require more storage space and thus each undesirable voice mail message using storage space is more burdensome. Therefore, in view of the foregoing, there is a need for a method, system, and program for managing VoIP voice mailboxes to filter out and automatically delete unwanted voice mail messages or facilitate user selection to quickly delete unwanted voice mail messages.

SUMMARY OF THE INVENTION

Therefore, the present invention provides a method, system, and program for improved management of voice mail by automatically prioritizing and removing unwanted voice mail messages.

In one embodiment, a voice mail filtering controller calculates a separate Bayesian score for each voice mail message from among multiple voice mail message entries received into a voice mailbox for a user, wherein each separate Bayesian score indicates a probability that the associated voice mail message is unwanted by the user. The voice mail filtering controller automatically deletes a selection of the voice mail messages each with a separate Bayesian score greater than a particular Bayesian score of the last played voice mail message from the voice mailbox. Voice mailbox may include at least some of the multiple voice mail message entries received from a telephone call supported by VoIP.

In particular, prior to playback of the voice mail message entries, the voice mail filtering controller calculates a separate Bayesian score for each voice mail message by detecting the words within each voice mail message that match words within a corpus, where each word within the corpus includes a probability of occurring within a voice mail and a probability of occurring within a voice mail either that is wanted or unwanted. Once the Bayesian scores are calculated, the voice mail filtering controller may automatically delete any voice mail messages with a Bayesian score greater than a particular threshold. In addition, once the Bayesian scores are calculated, voice mail filtering controller sorts the voice mail messages in order from lowest Bayesian score to highest Bayesian score and plays the voice mail message entries in the sorted order. While the voice mail messages are playing back, the user has the option to select to delete all voice mail messages with a Bayesian score greater than the Bayesian score of the last played message.

The voice mail filtering controller adds words to the corpus from multiple sources. First, the voice mail filtering controller may add words to the corpus from the words detected within at least one voice mail message saved by the user during playback or within at least one voice mail message deleted by the user during playback and marked as unwanted voice mail. Second, the voice mail filtering controller may add words to the corpus from the words detected during at least one conversation between the user ant at least one other participant.

In addition, the voice mail filtering controller may filter voice mail messages according to the identity of the sender. The voice mail filtering controller detects whether a separate voice characteristic for each voice mail message matches at least one voice imprint from among multiple voice imprints, wherein each of the voice imprints is marked as either permitted or excluded. The voice mail filtering controller automatically deletes those voice mail messages with voice characteristics that match one of the voice imprints marked as excluded.

The voice mail filtering controller may build the voice imprints from multiple sources. Voice mail filtering controller may sample a portion of a conversation between the user and at least one other call participant and add the sampling to the voice imprints marked as permitted. Voice mail filtering controller may sample a portion of a voice mailbox greeting and add the sampling to the voice imprints marked as permitted. Voice mail filtering controller, responsive to detecting a selection by the user to delete a particular voice mail message because the message is unwanted, adds a sampling of the voice mail message to the voice imprints marked as excluded.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
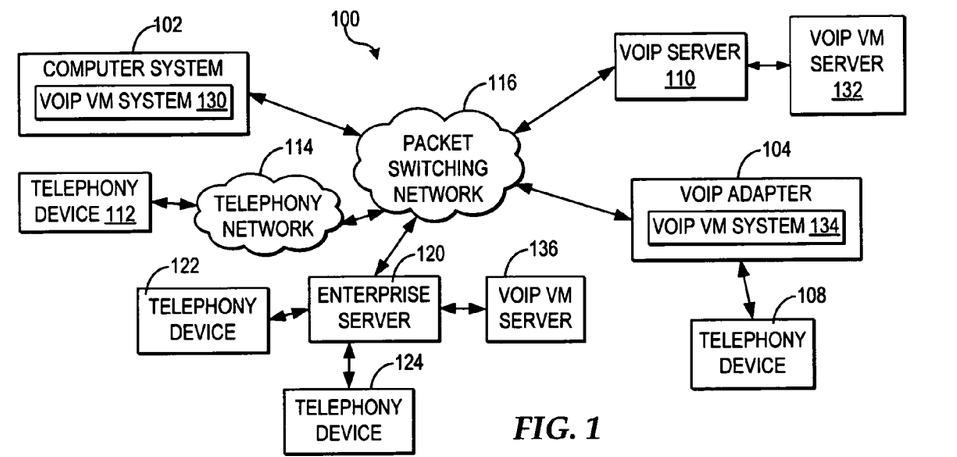
FIG. 1 is a block diagram illustrating one embodiment of a distributed communication network for supporting voice communications with VoIP voice mail systems for storing VoIP voice mail messages.

With reference now to FIG. 1, a block diagram illustrates one embodiment of a distributed communication network for supporting voice communications with VoIP voice mail systems for storing VoIP voice mail messages. It will be understood that FIG. 1 is representative of one example of a distributed, communication network for supporting voice communications, however other network configurations and network components may be implemented for supporting voice communications and the voice mail system of the present invention.

In general, FIG. 1, illustrates distributed communication network 100 in which voice communications are supported through at least one circuit switching telephony network 114, such as the Public Switching Telephone Network (PSTN), alone or in combination with at least one packet switching network 116, such as the Internet. Circuit switching telephony network 114 may include a single or multiple circuit switching networks and infrastructure including, but is not limited to, the PSTN, private telephone systems, and wireless service networks. Packet switching network 116 may include, but is not limited to, the Internet, private wide area networks (WANs), local area networks (LANs), and packet switching network service provider infrastructure. It will be understood that in addition to supporting voice communications, telephony network 114 and packet switching network 116 may also support data, video, and other media of communications.

Voice communications supported through packet switching network 116 are generally referred to as Voice over Internet Protocol (VOIP) calls. It will be understood that in addition to or as an alternative to VoIP, other types of telephony may be implemented through packet switching network 116.

VoIP calls are implemented using a selection of protocols, where the selection depends upon the path of the call and where the protocols include, but are not limited to, Session Initiation Protocol (SIP) and Media Gateway Control Protocol (MGCP). Where a VoIP call is placed to or received from a telephony device 112, connected to telephony network 114, a gateway (not depicted) supporting communications between packet switching network 116 and telephony network 114 may implement additional protocols to support the VoIP call.

Different types of systems with different communicative connections to packet switching network 116 may be used in a VoIP call. In general, each system, whether a stand-alone telephony unit or combination of network systems, enables voice communication using VoIP protocols.

In one example, a computer system 102 communicatively connected to packet switching network 116 acts as a VoIP telephony device through which a user may place and receive VoIP calls. For example, computer system 102 may run a VoIP application that supports VoIP calls to computer system 102. Microphones, speakers, and other input and output interface connected to computer system 102 enable a user to interact during the VoIP call. In another example, a user may log on to a VoIP service provider, such as by logging on through a web page browser to connect with VoIP server 110. VoIP server 110 then facilitates the VoIP call between computer system 102 and at least one other telephony system. Further, a VoIP application running locally at computer system 102 may function in combination with a service provided by VoIP server 110 to facilitate a VoIP call.

In another example, a VoIP adapter 104, communicatively connected to packet switching network 116, converts the analog signal used by telephony device 108 into digital data for transmission over packet switching network 116 in a VoIP call. VoIP adapter 104, alone or in combination with a computer system may include the VoIP application or firmware for facilitating a VoIP call with telephony device 108.

In yet another example, an enterprise server 120, communicatively connected to packet switching network 116, provides a gateway for facilitating multiple simultaneous VoIP calls to multiple telephony devices, such as telephony devices 112 and 124. In one example, telephony devices 122 and 124 are VoIP equipped stand-alone telephony devices and enterprise server 120 provides a gateway to systems connected within the enterprise network system to packet switching network 116. In another example, telephony devices 122 and 124 are standard telephony devices and enterprise server 120 provides the gateway to packet switching network 116, runs a VoIP application to facilitate VoIP calls, and converts between analog and digital signals.

In one example, a VoIP service provider may provide the VoIP applications or firmware for download from VoIP server 110 to computer systems, such as computer system 102 or enterprise server 120, or to adapters, such as VoIP adapter 104. In another example, the VoIP application may be implemented through a web browser interfacing with VoIP server 110. Further, in yet another example, a stand-alone VoIP equipped system performs the functions described with reference to a VoIP application.

Support for a VoIP call may also include additional VoIP services. VoIP services may include, but are not limited to, caller identification, call waiting, call transfer, repeat dial, return call, and three-way calling. In addition, a VoIP service associated with VoIP calls may include a voice mail service. VoIP services, including voice mail service, may be provided by a VoIP specific service provider or by a telephony service provider, for example.

A VoIP application running at a computer or telephony system, VoIP server 110, or other service systems may provide and manage the VoIP services for a particular user. A VoIP voice mail system may reside locally, such as VoIP voice mail (VM) system 130 at computer system 102 or VoIP voice mail (VM) system 134 at VoIP adapter 104. In addition, a VoIP voice mail system may reside remotely with shared remote storage, through a subscription or private network, such as VoIP voice mail (VM) server 132 accessible through VoIP server 110 or VoIP voice mail (VM) server 136 accessible through enterprise server 120.

Each VoIP voice mail system may include standard voice mailboxes for storing telephony based communications in a data storage system or memory. In addition, each VoIP voice mail system may include standard options for a user to play, store, delete, copy, or redistribute voice mail messages.

To aid the user in more efficient playback of stored VoIP voice mail messages, as will be further described, a VoIP voice mail system filters VoIP voice mail messages to aid the user in deleting potentially unwanted and unsolicited VoIP voice mail messages (herein referred to as unwanted voice mail) without the user having to listen to these types of messages. As will be further described, in filtering out voice mail messages according to content, a VoIP voice mail system may detect a Bayesian score for each voice mail message, prioritize playback of voice mail messages according to Bayesian score, and provide the user the option to delete all voice mail messages with a Bayesian score greater than a particular score, such as the score of the currently played message. In addition, as will be further described, in filtering out voice mail messages according to caller identity, a VoIP voice mail system may filter out or reorder those voice mail messages with voice characteristics that do not match a voice imprint of a permitted caller. By filtering voice mail messages both by content and caller identity, a VoIP voice mail system reduce the number of unwanted voice mail messages that are stored in a voice mailbox or listened to by the user.

It is important to note that additional or alternative types of VoIP enabled systems with VoIP voice mail systems may communicate within distributed communication network 100 and that systems are depicted for purposes of illustration. For example, a stand-alone VoIP enabled telephony device may directly connect to packet switching network or connect via a wireless service provider and include a VoIP voice mail system or portions thereof, resident in the stand-alone VoIP enabled telephony device.

Figure 2:
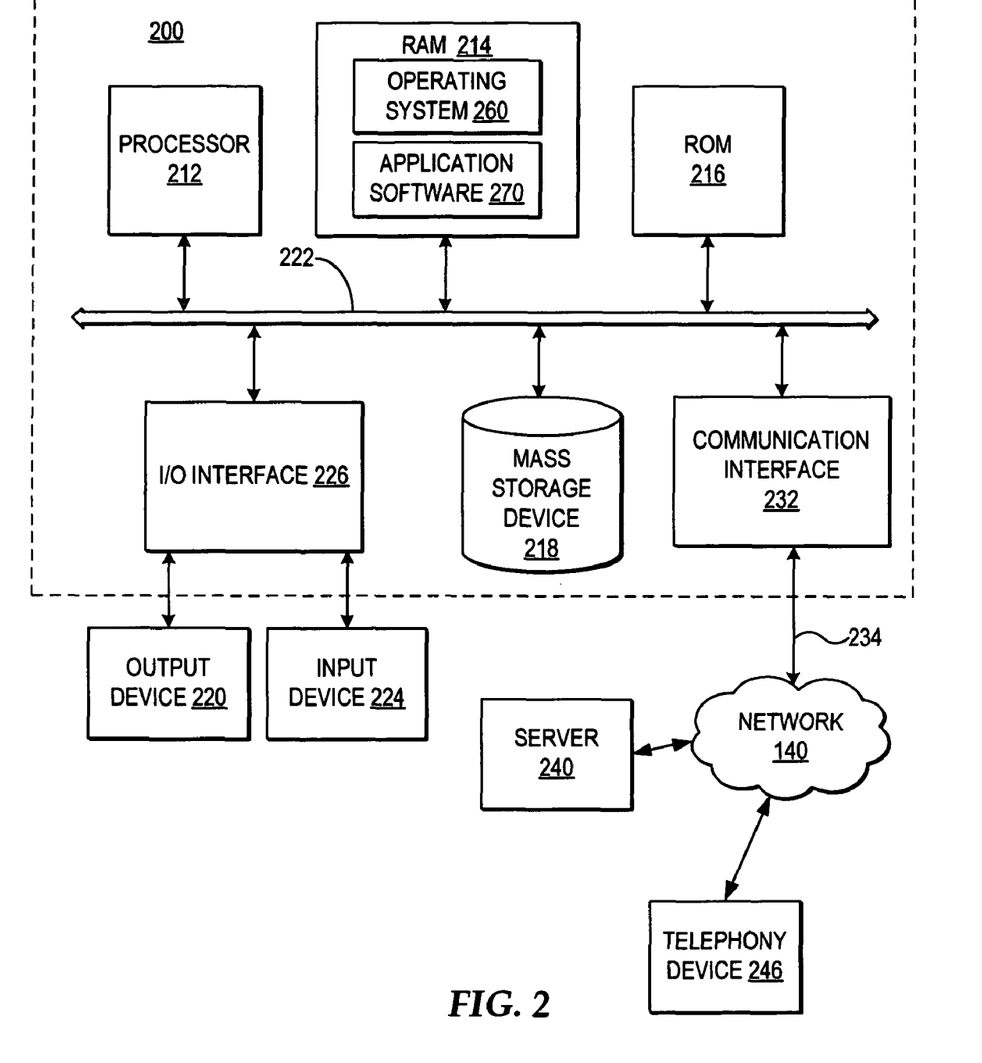
FIG. 2 is a block diagram depicting one embodiment of a computing system through which the telephony device, computer system, server, or network systems of the present method, system and program product may be implemented.

Referring now to FIG. 2, a block diagram depicts one embodiment of a computing system through which the telephony device, computer system, server, or network systems of the present method, system and program product may be implemented. The present invention may be executed in a variety of systems, including a variety of computing systems and electronic devices.

Computer system 200 includes a bus 222 or other communication device for communicating information within computer system 200, and at least one processing device such as processor 212, coupled to bus 222 for processing information. Bus 222 preferably includes low-latency and higher latency paths that are connected by bridges and adapters and controlled within computer system 200 by multiple bus controllers. When implemented as an email server, computer system 200 may include multiple processors designed to improve network servicing power.

Processor 212 may be a general-purpose processor such as IBM's PowerPC™ processor that, during normal operation, processes data under the control of an operating system 260, application software 270, middleware (not depicted), and other code accessible from a dynamic storage device such as random access memory (RAM) 214, a static storage device such as Read Only Memory (ROM) 216, a data storage device, such as mass storage device 218, or other data storage medium. Operating system 260 may provide a graphical user interface (GUI) to the user. In one embodiment, application software 270 may contain machine executable instructions for controlling voice communications and VoIP voice mail systems that when executed on processor 212 carry out the operations depicted in the flowcharts of FIGS. 6, 7, and 8 and other operations described herein. Alternatively, the steps of the present invention might be performed by specific hardware components that contain hardwired logic for performing the steps, or by any combination of programmed computer components and custom hardware components.

The VoIP communication and VoIP voice mail system of the present invention may be provided as a computer program product, included on a machine-readable medium having stored thereon the machine executable instructions used to program computer system 200 to perform a process according to the present invention. The term "machine-readable medium" as used herein includes any medium that participates in providing instructions to processor 212 or other components of computer system 200 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 400 can read and which is suitable for storing instructions. In the present embodiment, an example of a non-volatile medium is mass storage device 218 which as depicted is an internal component of computer system 200, but will be understood to also be provided by an external device. Volatile media include dynamic memory such as RAM 214. Transmission media include coaxial cables, copper wire or fiber optics, including the wires that comprise bus 222. Transmission media can also take the form of acoustic or light waves, such as those generated during radio frequency or infrared data communications.

Moreover, the present invention may be downloaded as a computer program product, wherein the program instructions may be transferred from a remote computer such as a server 240 to requesting computer system 200 by way of data signals embodied in a carrier wave or other propagation medium via a network link 234 (e.g. a modem or network connection) to a communications interface 232 coupled to bus 222. Communications interface 232 provides a two-way data communications coupling to network link 234 that may be connected, for example, to a local area network (LAN), wide area network (WAN), or directly to an Internet Service Provider (ISP). In particular, network link 234 may provide wired and/or wireless network communications to one or more networks, such as network 140.

Network link 234 and network 140 both use electrical, electromagnetic, or optical signals that carry digital data streams. The signals through the various networks and the signals on network link 234 and through communication interface 232, which carry the digital data to and from computer system 200, are forms of carrier waves transporting the information.

When implemented as a VoIP enabled system, computer system 200 may communicate in a VoIP call with a standard telephone device, as described with reference to FIG. 1, or with another VoIP enabled system, such as VoIP enabled telephony system 246.

When implemented as a network server, computer system 200 may include multiple communication interfaces accessible via multiple peripheral component interconnect (PCI) bus bridges connected to an input/output controller. In this manner, computer system 200 allows connections to multiple network computers via multiple separate ports.

In addition, computer system 200 typically includes multiple peripheral components that facilitate communication. These peripheral components are connected to multiple controllers, adapters, and expansion slots, such as input/output (I/O) interface 226, coupled to one of the multiple levels of bus 222. For example, input device 224 may include, for example, a microphone, a keyboard, a mouse, or other input peripheral device, communicatively enabled on bus 222 via I/O interface 226 controlling inputs. In addition, for example, a output device 220 communicatively enabled on bus 222 via I/O interface 226 for controlling outputs may include, for example, one or more graphical display devices, but may also include other output interfaces, such as an audio output interface. In alternate embodiments of the present invention, additional input and output peripheral components may be added.

Those of ordinary skill in the art will appreciate that the hardware depicted in FIG. 2 may vary. Furthermore, those of ordinary skill in the art will appreciate that the depicted example is not meant to imply architectural limitations with respect to the present invention.

Figure 3:
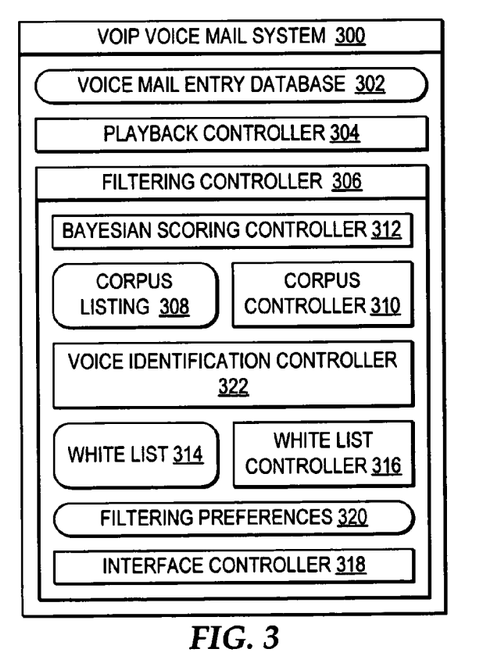
FIG. 3 is a block diagram illustrating a voice mail system for filtering out unwanted voice mail.

With reference now to FIG. 3, a block diagram illustrates a voice mail system for filtering out unwanted voice mail. As illustrated, a VoIP voice mail system 300 includes multiple components and data systems, however, it will be understood that voice mail system 300 may include additional or alternate components and data systems. In addition, it will be understood that the components of voice mail system 300 may be distributed across one or more computer systems and that voice mail system 300 may be shared by multiple users.

First, voice mail system 300 includes a voice mail entry database 302. As voice mail messages are recorded, a new entry for each voice mail message is created in database 302. The time of arrival, caller identification for the sending telephony system and other information may be included with the new entry for each voice mail message in database 302, which may also be termed a voice mailbox. Further, additional information about each voice mail message may be added to the entry in database 302 at the time of arrival, during playback, or at any other time period. It will be understood that once voice mail system 300 answers a call, voice mail system 300 may trigger an interactive voice response unit or other prompting system to prompt the caller to leave a message that is recorded and stored in voice mail entry database 302. In addition, it will be understood that where voice mail system 300 is shared between multiple users, voice mail entry database 302 may include multiple physical or logical units, with a separate unit for storage of voice mail messages separately left for each user, as will be illustrated with respect to FIG. 5.

A playback controller 304 controls playback of voice mail message entries within database 302. Playback controller 304 also facilitates a user selection interface from which a user may select options for playback of messages stored within voice mail entry database 302.

A filtering controller 306 filters the voice mail entries within voice mail system 300. In one example, filtering controller 306 may filter voice mail entries at different times, including, but not limited to, prior to storage in database 302, while voice mail messages are waiting in database 302 prior to playback, or during playback of voice mail messages by playback controller 304. In one embodiment, filtering controller 306 filters voice email entries both by identity of sender and content. In other embodiments, filtering controller 306 may filter voice email entries only by identity of sender or content. It will be understood that in addition to identity of sender and content, filtering controller 306 may filter voice mail entries according to other filtering parameters.

In one example of content-based filtering, filtering controller 306 filters voice mail entries according to Bayesian score. In particular, a Bayesian scoring controller 312 analyzes and calculates a Bayesian score for each voice mail entry. In calculating a Bayesian score, Bayesian scoring controller 312 calculates the probability that a voice mail message is unwanted voice mail. In general, a Bayesian score is calculated based on the assumption that particular words have particular probabilities of occurring either in unwanted mail or wanted mail. For example, a user encountering a voice mail message with the names of particular products not preferred by the user would mark the voice mail message as unwanted voice mail, but will seldom mark the voice mail message as wanted, and therefore the names of the particular products would have a high probability of occurring in unwanted voice mail.

In one equation used by Bayesian scoring controller 312, the probability that a voice mail message is unwanted voice mail is equal to the probability of finding those certain words in unwanted voice mail, times the probability that any voice mail is unwanted, divided by the probability of finding those certain words in any email. Therefore, to calculate the probability that a voice mail message is unwanted voice mail, Bayesian scoring controller 312 scans a voice mail entry for the certain words that match with words in a corpus listing 308. In the example, corpus listing 308 includes multiple words and for each word lists the probability that the word will be in any voice mail message and the probability that a voice mail message with the word is either unwanted mail or wanted mail. In addition, corpus listing 308 includes a probability that any voice mail is unwanted for the particular user. Data included in corpus listing 308 may be accessed from a service provider or filtering service, manually entered by a user, or built by a corpus controller 310.

In calculating a Bayesian score, Bayesian scoring controller 312 may first convert the voice mail from voice into text or through other voice recognition method detect the words of the voice mail. Using voice recognition or a voice to text converted will be understood by one with skill in the art. In one example, ViaVoice (ViaVoice is a trademark of International Business Machines Corporation) is a software product that perform voice recognition.

In the example of content-based filtering, corpus controller 310 builds corpus listing 308 and updates the probabilities for words to be located within unwanted voice mail and for any voice mail to be unwanted within corpus listing 308 from multiple sources. In one example, corpus controller 310 builds corpus listing 308 with words and probabilities associated with each word by monitoring all or portions of actual conversations and detecting the keywords within the monitored portions of the actual conversations. In another example, corpus controller 310 builds corpus listing 308 with words and probabilities by detecting keywords within voice mail messages listened to and saved by the user within voice mail entry database 302. Further, corpus controller 310 builds corpus listing 308 with words with a probability as unwanted voice mail by detecting words within those voice mail messages that a user deletes during playback before the end of the message or that a user deletes and marks as unwanted voice mail.

In one example of identity-based filtering, filtering controller 306 filters voice mail message entries according to caller identity. In the example, a white list 314 includes voice imprints, where each voice imprint is marked as permitted or excluded. For each voice mail message, a voice identification controller 322 detects the voice characteristics for a speaker leaving a voice mail message. In detecting the characteristics, voice identification controller 322 may detect characteristics such as pace, tone, inflection and other voice signature identifiers. Voice identification controller 322 compares the voice characteristics with the voice imprints in white list 314. If voice identification controller 322 detects a match between the voice characteristics in the voice mail message and a permitted voice imprint within white list 314, then filtering controller 306 maintains the voice mail message and allows playback. If voice identification controller 322 detects a match between the voice characteristics in the voice mail message and an excluded voice imprint within white list 314, then filtering controller 306 may automatically delete the voice mail message or may automatically mark the voice mail message as unwanted voice mail. Voice identification controller 322 does not detect a match then filtering controller 306 may tag the voice mail message and prompt the recipient to indicate whether to add a voice imprint for the sender to white list 314, and whether to add the voice imprint as permitted or excluded.

In matching voice characteristics to a voice imprint, voice identification controller 322 may perform biometric analysis or voice authentication for the actual analysis. Using biometric voice identification or voice authentication will be understood by one with skill in the art.

A white list controller 316 builds the voice imprints within white list 314. In one example, white list controller 306 monitors actual conversations and detects the voice imprints from those conversations. White list controller 316 may prompt the user to specify, when the user is participating in a conversation, whether a voice imprint for the participant should be added to white list 314 and whether to mark the voice imprint as permitted. In another example, white list controller 306 monitors playback of voice mail messages. If a user saves a voice mail message, white list controller 306 detects and stores a voice imprint from the saved voice mail message and marks the voice imprint as permitted. If a user deletes a voice mail message before playback ends, white list controller 306 detects and stores a voice imprint from the saved voice mail message and marks the voice imprint as excluded.

Filtering preferences 320 may include multiple types of preferences for the performance of filtering controller 306. In one example, a filtering preference may indicate whether the user prefers for filtering controller 306 to filter messages upon receipt into voice mail entry database 302, at a particular time, or during playback by voice mail playback controller 304. In another example, a filtering preference may indicate whether the user prefers for filtering controller 306 to provide prompts for user approval of new entries within corpus 308 and white list 314 or whether filtering controller 306 is to automatically add new entries to corpus 308 and white list 314. In yet another example, a filtering preference may indicate whether the user prefers for filtering controller 306 to filter messages by white list, by Bayesian score or by both. Further, a filtering preference may indicate a highest threshold Bayesian score, where those messages with a Bayesian score greater than the threshold should be automatically deleted. Additionally, a filtering preference may indicate a user's preference for how filtering related information should be output and which selectable options should be output for user selection.

An interface controller 318 controls output of filtering related information and selectable options according to the information and options available and further according to selections within filtering preferences 320. In one example, interface controller 308 controls output, during playback of voice mail messages, of the Bayesian score calculated for each voice mail message. In another example, interface controller 308 controls output, during playback of voice mail messages, of an option to mark a message as unwanted voice mail and an option to delete all voice mail messages with a Bayesian score equal to or greater than the Bayesian score of a message marked as unwanted voice mail or a last played message. It will be understood that interface controller 308 may control output of additional or other types of information and selectable options.

Figure 4:
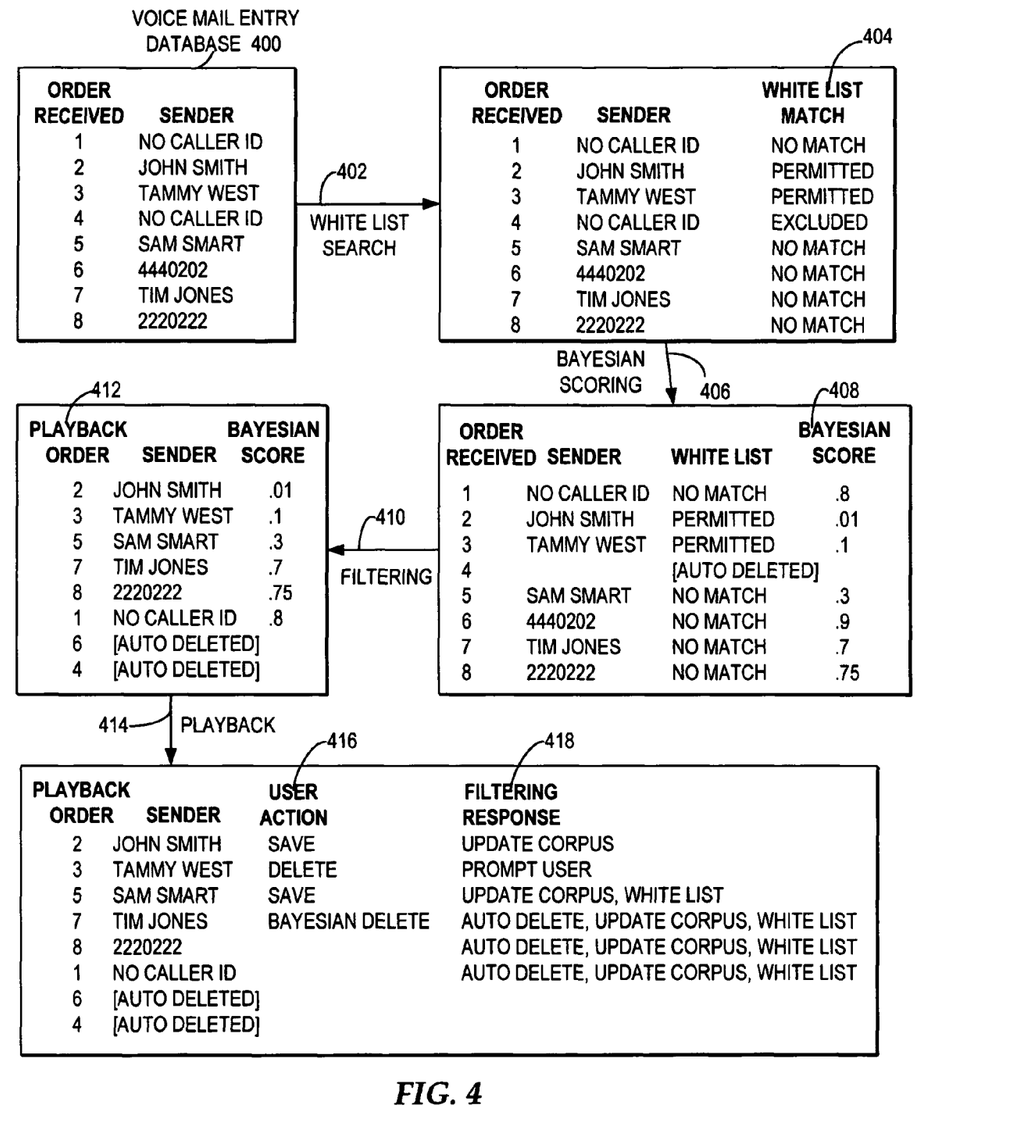
FIG. 4 is an illustrative diagram depicting one example of filtering out unwanted voice mail messages before and during playback.

Referring now to FIG. 4, an illustrative diagram shows one example of filtering out unwanted voice mail before and during playback. In the example, voice mail entry database 400 includes multiple entries numbered according to time of arrival and indicated by sender identifier. Each entry depicts a name of the sender illustrated at reference numeral 402, a date and time of arrival illustrated at reference numeral 404, and a Bayesian score illustrated at reference numeral 406.

Prior to playback of the messages within voice mail entry database 400, as illustrated at reference numeral 402, filtering controller 306 triggers voice identification controller 322 to search for a white list voice imprint matching a sample of the voice characteristics from each voice mail message. In the example, as illustrated, white list match column 404 indicates the results of voice identification controller 322 searching for white list matches. In the example, voice identification controller 322 identifies the voice mail messages from senders "John Smith" and "Tammy West" as matching permitted voice imprints, the voice mail message received $4^{th}$ with no caller identifier (ID) as matching an excluded voice imprint, and the remaining voice mail messages as not matching a voice imprint within the white list. Based on the matching performed by voice identification controller 322, filtering controller 306 automatically updates corpus listing 308 with words indicating unwanted voice mail from entry "4" and deletes entry "4" with voice characteristics matching an excluded voice imprint. In another example, filtering controller 306 may prompt the user to select to delete the entry with voice characteristics matching an excluded voice imprint or may prioritize the entry at the end of the play list, rather than automatically deleting the entry.

Next, filtering controller 306 triggers Bayesian scoring controller 312 to calculate a Bayesian score for each voice mail message, as indicated at reference numeral 406. In an alternate example, Bayesian scoring controller 312 may only calculate a Bayesian score for those voice mail messages that with voice characteristics that do not match a voice imprint or for other groupings of voice mail messages. In the example, as illustrated, Bayesian score column 408 indicates the results of Bayesian scoring controller 312 calculating a Bayesian score for each voice mail message entry. In the example, the Bayesian score represents the probability that a voice mail message is unwanted voice mail.

Based on the Bayesian scoring performed by Bayesian scoring controller 312, filtering controller 306 may automatically delete those voice mail messages with a Bayesian score greater than a particular threshold, such as 80%, illustrated as 0.8. In the example, filtering controller 306 would automatically delete entry "6" with a Bayesian score of 0.9. In another example, filtering controller 306 may prompt the user with a listing of those entries with a Bayesian score greater than the threshold and request user selection of particular entries or all entries to be deleted. Where voice mail messages are deleted based on a Bayesian score greater than the threshold, voice samples from each voice mail message are added as excluded voice imprints to white list 314 and words from each voice mail message are added to corpus listing 308 as indicative of unwanted voice mail.

Next, filtering controller triggers filtering of the remaining voice mail messages to order the voice mail messages according to Bayesian score and then according to other criteria, as illustrated at reference numeral 410. In the example, playback order column 412 indicates the ordering of entries for playback. In particular, entries "2", "3", "5", "7", "8" and "1" are ordered according to Bayesian score, from lowest to highest score. In addition, place holders indicating the automatically deleted entries "6" and "4" are included with entries deleted according to Bayesian score threshold listed prior to entries deleted according to excluded voice imprint. In other examples, other criteria may be used in ordering the voice mail message entries and place holders.

Playback controller 304 begins playback of the voice mail message entries as ordered, as illustrated at reference numeral 414. During playback, a user action column 416 indicates the user action or selection for each voice mail message and a filtering response column 418 indicates the response of filtering controller 306 to the user action. In the example, for entry "2" the user selects to save the voice mail message. In response to the user selection, filtering controller 418 triggers corpus controller 310 to update corpus listing 308 with keywords from the wanted voice mail message. Since the sender is already identified by a voice imprint in white list 314, a new entry need to be added, however, a user may select a preference to update white list entries periodically or with multiple samples from a single sender. Next, in the example, for entry "3" the user selects to delete the voice mail message. In response, filtering controller 418 triggers interface controller 318 to prompt the user to select whether to mark the voice mail message as unwanted for the update to corpus listing 308 and white list 314. Thereafter, in the example, for entry "5" the user selects to save the voice mail message. In response, filtering controller 418 triggers corpus controller 310 to update corpus listing 308 with keywords from the wanted voice mail and triggers white list controller 316 to add a voice imprint from a sample of the voice mail message to white list 314 and mark the voice imprint as permitted.

Next, in the example, for entry "7" the user selects a "Bayesian delete" which requests that all voice mail message entries with a Bayesian score greater than the previous voice mail message be deleted. In response, filtering controller automatically deletes entries "7", "8", and "1" and updates corpus listing 308 and white list 314 for each voice mail message as unwanted voice mail and excluded senders.

Figure 5:
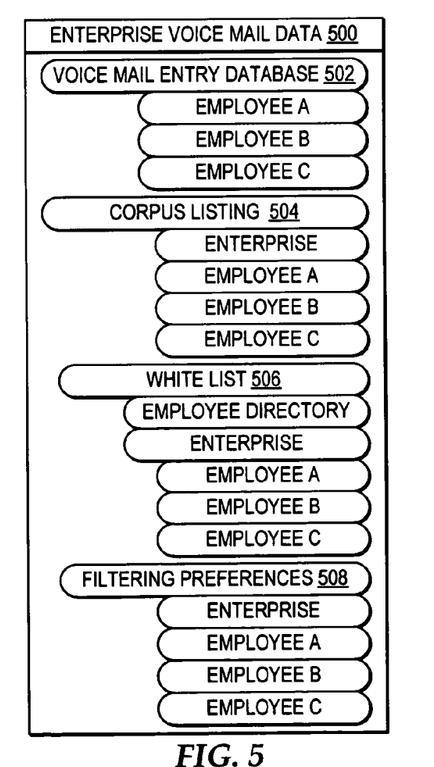
FIG. 5 is an illustrative diagram illustrating one example of the types of data stored for use by a voice mail system shared within an enterprise.

With reference now to FIG. 5, an illustrative diagram shows one example of the types of data stored for use by a voice mail system shared within an enterprise. In the example, enterprise voice mail data 500 may reside within one or more data storage systems, such as enterprise voice mail server 136 within an enterprise network system or distributed across telephony devices accessible within the enterprise network system, such as telephony devices 122 and 124. It will be understood that enterprise voice mail data 500 may also reside in other data storage systems within and outside an enterprise network system.

In the example, a voice mail entry database 502 includes a separate voice mailbox for each employee. In particular, in the example, the employees A, B and C are representative of different employees, each with a separate voice mailbox in which voice mail messages intended for that employee are stored.

In addition, in the example, a corpus listing 504 includes separate listings for an enterprise and then for each employee. When Bayesian scoring controller 312 calculates a Bayesian score for a voice mail message, Bayesian scoring controller 312 may access both the enterprise corpus listing and the corpus listing for a particular employee. In addition, when corpus controller 310 updates corpus listing 504, corpus controller 504 may detect common words within the employee corpus listing and add the common words to the enterprise corpus listing. Further, an enterprise system may subscribe to a service that monitors voice mail traffic, calculates corpus words with Bayesian percentages, and updates the enterprise corpus listing periodically.

A white list 506 includes an employee directory with voice imprints for each employee and an enterprise list with enterprise-wide permitted and excluded callers. In addition, each employee may select to store voice imprints for permitted and excluded callers. When voice identification controller 322 searches for a voice imprint matching sampled voice characteristics from a voice mail message, voice identification controller 322 may search both the enterprise white list and an employee white list for a matching voice imprint. In addition, when white list controller 316 updates white list 506, white list controller 316 may detect common voice imprints among employee lists and add the common voice imprints to the enterprise list. Further, white list controller 316 may monitor calls for each employee and update the voice imprints in the enterprise and employee lists with sampled conversations.

In one example, within an enterprise system, white list controller 316 may seed the employee directory white list with employee voice imprints by sampling the voice mailbox greeting recorded by each employee. In another example, within an enterprise system, white list controller 316 may seed the employee directory white list by placing a call to the employee and prompting the employee to speak particular words or sounds for storage as a voice imprint.

In another example, within an enterprise system, by tracking patterns among employee corpus lists and white lists and updating the enterprise corpus list and white list with common words and voice imprints, an enterprise system can actively monitor for and delete unwanted voice mail from employee voice mailboxes to avoid overloading the data storage system available for storage of voice mail message with unwanted voice mail. In particular, an enterprise system may temporarily acquire additional storage space, such as on-demand storage, that is paid for by use. Where an enterprise system adapts to additional storage needs by paying for additional storage space, an enterprise system may need to limit the number of unwanted voice mail messages stored in the on-demand storage space to reduce costs.

In yet another example, within an enterprise system, by including employee voice imprints within white list 506, the voice mail system may use voice authentication to log an employee in to access voice mail messages for that employee.

Thus, the voice imprints could be used both for authenticating an employee to log into the voice mail system and to authenticate that a voice mail sent by the employee is not spoofed, but is from the employee designated in the caller identification detected from the Advanced Intelligent Network (AIN) call identification or Lightweight Directory Access Protocol (LDAP) call identification.

Figure 6:
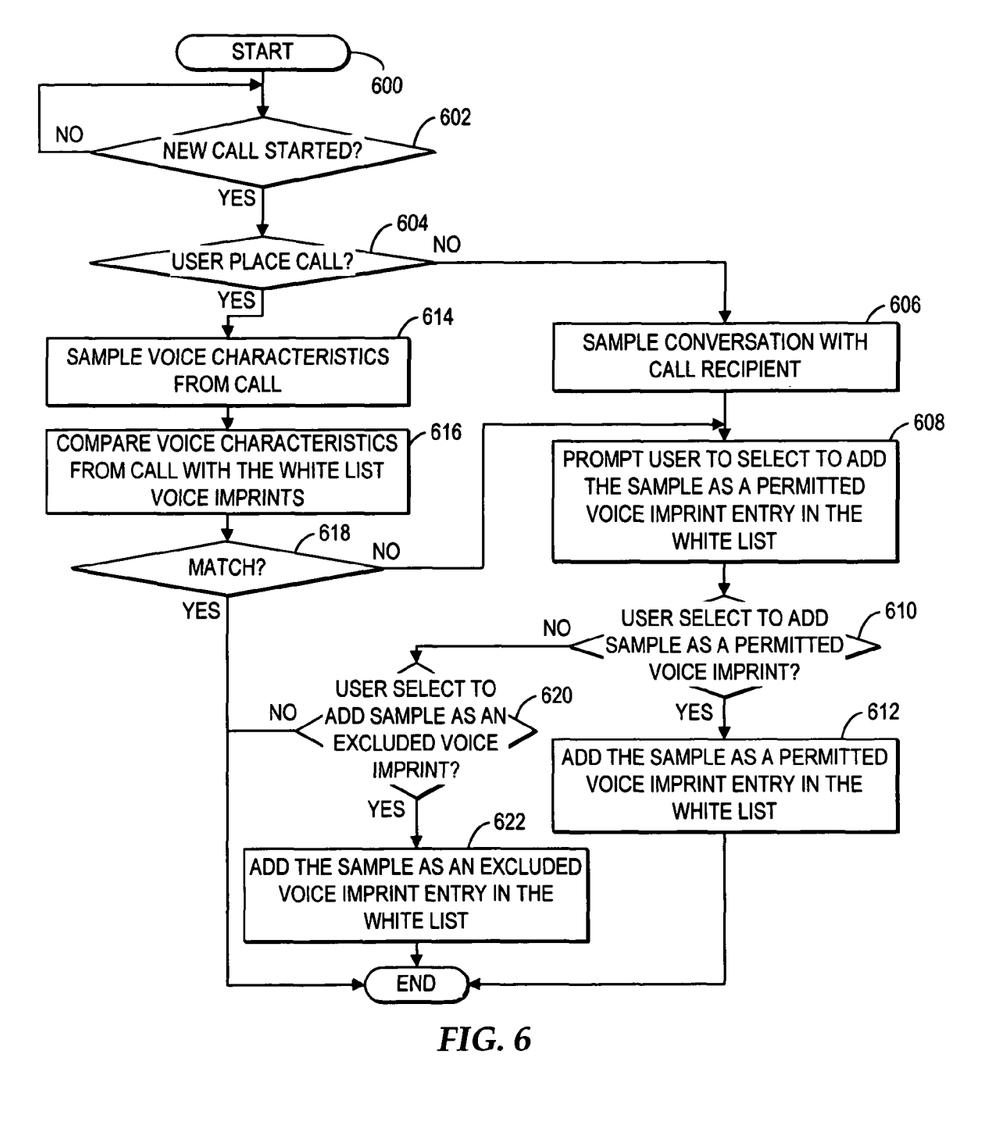
FIG. 6 is a high level logic flowchart depicting a process and program for controlling updates to a white listing.

Referring now to FIG. 6, a high level logic flowchart depicts a process and program for controlling updates to a white listing. As illustrated, the process starts at block 600 and thereafter proceeds to block 602. Block 602 depicts a determination whether a new call is started. If a new call is started, then the process passes to block 604. At block 604, the filtering controller determines whether or not the user placed the call. If the user receives the call, then the process passes to block 606. Block 606 depicts sampling the conversation with the call recipient. Next, block 608 depicts prompting the user to select to add the sample as a permitted voice imprint entry in the white list. Thereafter, block 610 depicts a determination whether the user selects to add the sample as a permitted voice imprint. If the user selects to add the sample, then the process passes to block 612. Block 612 depicts adding the sample as a permitted voice imprint entry in the white list, and the process ends. Returning to block 610, if the user does not select to add the sample as a permitted voice imprint, then the process passes to block 620. Block 620 depicts a determination whether the user selects to add the sample as an excluded voice imprint. If the user selects to add the sample as an excluded voice imprint, then the process passes to block 622. Block 622 depicts adding the sample as an excluded voice imprint entry in the white list, and the process ends. It is important to note that the prompting of the user may occur during the call or following the conclusion of the call.

Returning to block 604, if the user places the call, then the process passes to block 614. Block 614 depicts sampling voice characteristics from the call. In another embodiment, a user may select a preference that when the user places a call, voice characteristics are only sampled at block 614 if the call is not placed to a number within the user's contact database. Next, block 616 depicts comparing the voice characteristics from the call with the voice imprints in the white list. Thereafter, block 618 depicts a determination whether there is a match between the sampled voice characteristics and a voice imprint in the white list. If there is a match, then the process ends. Alternatively, if there is a match, the user may be prompted to select whether to replace a previous voice imprint with the new sample or whether to add an additional sample for the sender. Returning to block 618, if there is not a match, then the process passes to block 608 and proceeds as previously described.

Figure 7:
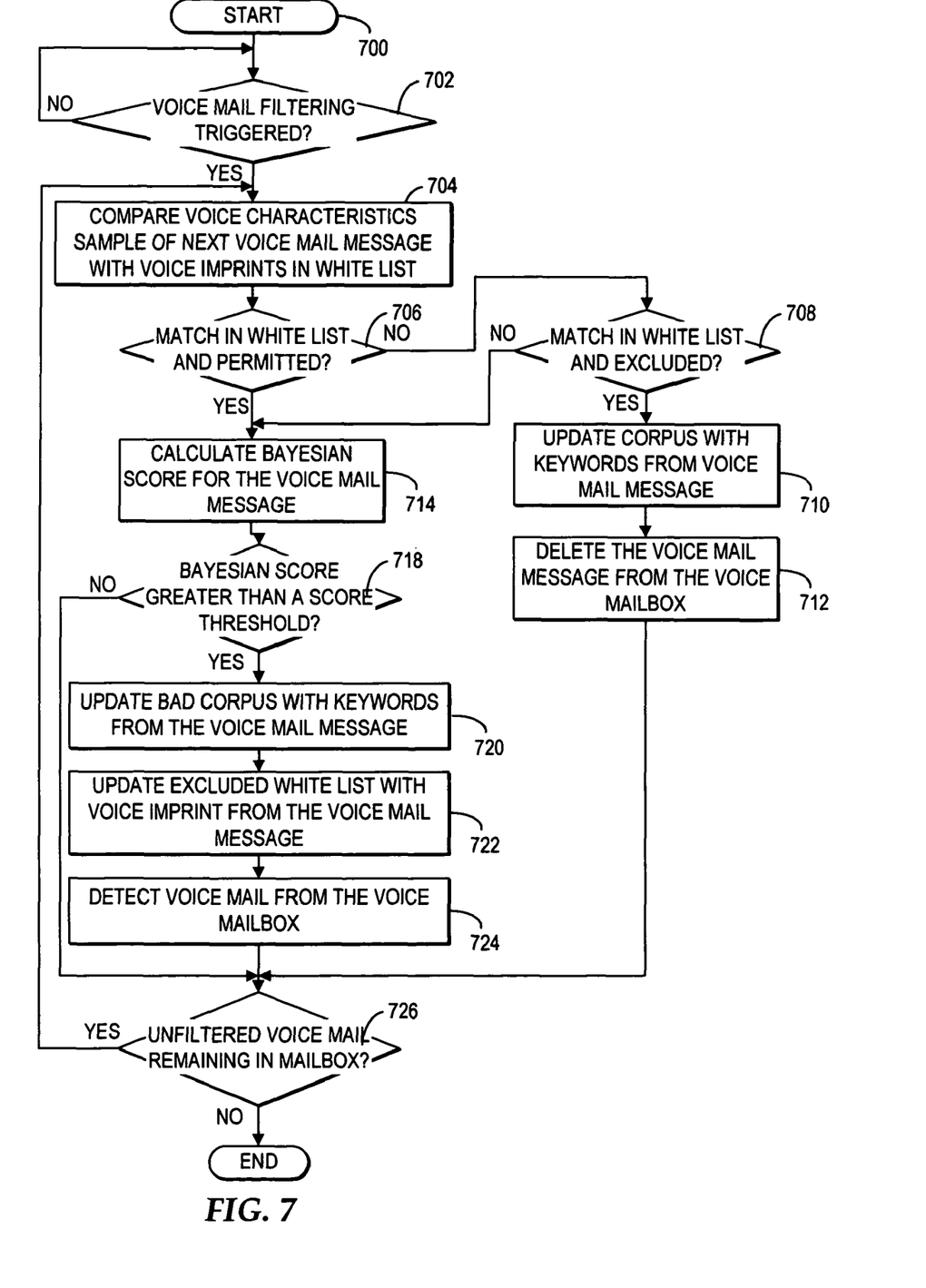
FIG. 7 is a high level logic flowchart illustrating a high level process and program for controlling filtering of voice mail messages.

With reference now to FIG. 7, a high level logic flowchart depicts a high level process and program for controlling filtering of voice mail messages. As illustrated, the process starts at block 700 and thereafter proceeds to block 702. Block 702 depicts a determination whether voice mail filtering is triggered. In one example the occurrence of an event specified in the filtering preferences, such as receipt of a new voice mail message or a user request to playback voice mail message entries, triggers voice mail filtering. If voice mail filtering is triggered, then the process passes to block 704.

Block 704 illustrates comparing voice characteristics of a sample of the next voice mail message with voice imprints in the white list. Next, block 706 depicts a determination whether there is a match between the voice characteristics and a voice imprint in the white list and the voice imprint is marked as permitted. If the filtering controller detects a match with a permitted voice imprint, then the process passes to block 714. Otherwise, at block 706, if the filtering controller does not detect a match with a permitted voice sample, then the process passes to block 708.

Block 708 depicts a determination by the filtering controller whether there is a match between the voice characteristics of a sample of the next voice mail message and a voice imprint in the white list and the voice imprint is marked as excluded. If the filtering controller detects a match with an excluded voice imprint, then the process passes to block 710. Block 710 depicts updating the corpus with the keywords from the voice mail message. In particular, the corpus is updated with keywords from a voice mail message that is considered an unwanted voice mail. Next, block 712 illustrates deleting the voice mail message from the voice mailbox, and the process passes to block 726.

Block 726 depicts a determination by the filtering controller whether there are still unfiltered voice mail messages remaining in the voice mailbox. If there are remaining unfiltered voice mail messages in the voice mailbox, then the process passes to block 704. If there are no remaining unfiltered voice mail messages in the voice mailbox, then the process ends.

Returning to block 708, if there is a match with an excluded voice imprint, then the process passes to block 714. Block 714 depicts calculating a Bayesian score for the voice mail message. Next, block 718 illustrates a determination by the filtering controller whether the Bayesian score is greater than a particular threshold. If the Bayesian score is less than a required score threshold, then the process passes to block 726. Otherwise, at block 718, if the Bayesian score is greater than a required score threshold, then the process passes to block 720. Block 720 depicts updating the bad corpus with keywords from the voice mail message. Next, block 722 illustrates updating the excluded white list with a voice imprint sampled from the voice mail message. Thereafter, block 724 depicts deleting the voice mail message from the voice mailbox, and the process passes to block 726.

It will be understood that in filtering voice mail messages within the voice mailbox, the filtering controller may perform additional steps or alternative steps to those depicted in FIG. 7. In particular, filtering preferences may indicate preferences for filtering voice mail messages with a voice characteristic that matches an excluded white list entry. For example, the filtering preference may indicate that the voice mail message should be marked as unwanted voice mail and prioritized at the end of the playback list. In addition, in particular, filtering preferences may indicate preferences for filtering voice mail with a Bayesian score greater than a score threshold. For example, the filtering preference may indicate that voice mail with a Bayesian score greater than a particular threshold should be moved into a different storage space and marked as unwanted voice mail.

Figure 8:
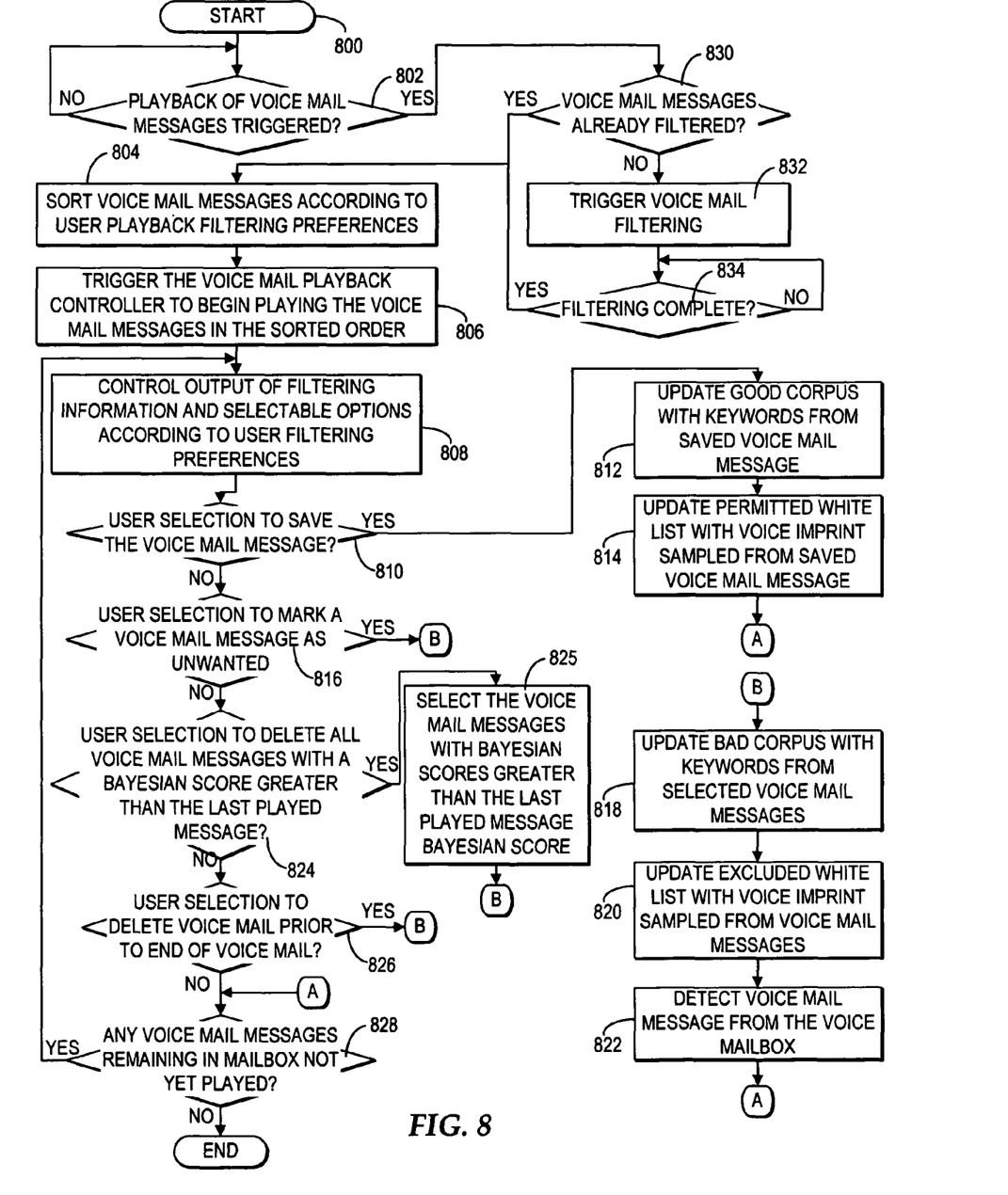
FIG. 8 is a high level logic flowchart depicts a process and program filtered playback of voice mail messages.

Referring now to FIG. 8, a high level logic flowchart depicts a process and program for controlling filtered playback of voice mail messages. As illustrated, the process starts at block 800 and thereafter proceeds to block 802. Block 802 depicts the filtering controller detecting whether playback of voice mail by the voice mail playback controller is triggered. When playback of voice mail is triggered, then the process passes to block 830.

Block 830 depicts a determination by the filtering controller whether all the voice mail messages waiting for playback are already filtered. If all voice mail messages are already filtered, then the process passes to block 804. If not all voice mail message are already filtered, then the process passes to block 832. Block 832 illustrates triggering the voice mail filtering illustrated at FIG. 7. Next, block 834 depicts a determination whether the voice mail filtering is complete. Once the voice mail filtering is complete, then the process passes to block 804.

Block 804 illustrates sorting the voice mail messages according to user playback filtering preferences. For example, a user playback filtering preferences may specify filtering from lowest Bayesian score to highest Bayesian score, so that the voice mail messages with the highest probability of being unwanted voice mail are played back last. Next, block 806 depicts triggering the voice mail playback controller to begin playing the voice mail messages in the sorted order. Thereafter, block 808 depicts controlling output of filtering information and selectable options according to user filtering preferences in association with the current voice mail message being played, and the process passes to block 810.

Block 810 illustrates a determination whether the user selects to save the voice mail message. If the user selects to save the voice mail message, then the process passes to block 812. Block 812 depicts updating the good corpus with keywords from the saved email. Next, block 814 illustrates updating the white list with a voice imprint sampled from the saved email, where the voice imprint is marked as permitted, and the process passes to block 828. Block 828 depicts a determination whether there are voice mail messages remaining in the mailbox that have not yet been played. If there are no unplayed voice mail messages remaining in the mailbox, then the process ends. If there are unplayed voice mail messages remaining in the mailbox, then the process passes to block 808.

Returning to block 810, if the user does not select to save the voice mail message, then the process passes to block 816. Block 816 depicts a determination whether the user selects to mark a voice mail message as unwanted voice mail. If the user selects to mark the voice mail message as unwanted, then the process passes to block 818. Block 818 illustrates updating the corpus with keywords from the selected voice mail message. Next, block 820 depicts updating the white list with a voice imprint sampled from the voice mail message, where the voice imprint is marked as excluded. Thereafter, block 822 illustrates deleting the voice mail message from the voice mailbox, and the process passes to block 828. Otherwise, returning to block 816, if the user does not select to mark a voice mail message as unwanted voice mail, then the process passes to block 824.

Block 824 illustrates a determination whether the user selects to delete all voice mail messages with a Bayesian score greater than the last played message. If the user selects to delete all voice mail messages with a Bayesian score greater than the last played message, then the process passes to block 825. Block 825 depicts selecting the voice mail messages with Bayesian scores greater than the last played message, and the process passes to block 818. It is important to note that in addition to the option to select to delete all voice mail messages with a Bayesian score greater than the last played message, a user may select from among other options, such as deleting all voice mail messages with a Bayesian score greater than the currently playing message, deleting all voice mail messages with a particular word spoken by the user while listening to or after listening to a particular voice mail message, or other options that allow a user to select to delete voice mail messages according to a particular criteria.

Returning to block 824, if the user does not select to delete all voice mail messages with a Bayesian score greater than the last played message, then the process passes to block 826. Block 826 depicts a determination whether the user selects to delete a voice mail message prior to the end of playback of the voice mail message. If the user selects to delete the voice mail message prior to the end of playback, then according to a filtering preference setting, the process passes to block 818. Otherwise, at block 826, if the user does not select to delete the voice mail message prior to the end of playback, then the process passes to block 828. It is important to note that a user may select additional or alternative filtering preferences in association a voice mail message deleted before the end of playback. For example, a filtering preference may specify that when the user selects to delete a voice mail message prior to the end of playback of the voice mail message, the filtering controller prompt the user to designate whether the voice mail message was unwanted.

While the invention has been particularly shown and described with reference to a preferred embodiment, it will be understood by those skilled in the art that various changes in form and detail may be made therein without departing from the spirit and scope of the invention.

What is claimed is:

1. A method for managing entries within a voice mailbox for at least one user, comprising:
   calculating a separate Bayesian score for each voice mail message from among a plurality of voice mail message entries received into said voice mailbox for said user, wherein each said separate Bayesian score indicates a probability that each said separate voice mail message is unwanted by said user; and
   responsive to a user selection during playback to delete entries, automatically deleting a selection of said plurality of voice mail message entries from said voice mailbox each with said separate Bayesian score greater than a particular Bayesian score of the last played voice mail message from said voice mailbox.

2. The method according to claim 1, further comprising:
   sorting said plurality of voice mail messages entries in an order from lowest Bayesian score to highest Bayesian score; and
   playing said selection of said plurality of voice mail messages entries in said order to said user.

3. The method according to claim 1, further comprising:
   responsive to calculating said separate Bayesian score for each said voice mail message, automatically deleting a second selection from among said plurality of voice mail messages entries each with said separate Bayesian score greater than a particular score threshold.

4. The method according to claim 1, wherein calculating a separate Bayesian score further comprises:
   calculating each said separate Bayesian score from matching words in each said voice mail message to a separate selection of words from a plurality of words within a corpus, wherein each of said plurality of words within said corpus comprises a probability of occurring in a voice mail and a probability of occurring in a voice mail that is unwanted.

5. The method according to claim 4, further comprising:
   adding said plurality of words to said corpus from at least one from among a first selection of words detected within at least one voice mail saved by said user during playback, a second selection of words detected during at least one conversation between said user and at least other participant, and a third selection of words detected within at least one voice mail deleted by said user and marked as unwanted voice mail.

6. The method according to claim 1, further comprising:
   detecting whether a separate voice characteristic for each said voice mail message from among said plurality of voice mail message entries matches at least one voice imprint from among a plurality of voice imprints, wherein each of said plurality of voice imprints is marked as one from among permitted or excluded; and automatically deleting a second selection of said plurality of voice mail message entries from said voice mailbox each with said separate voice characteristic matching one from among said plurality of voice imprints marked as excluded.

7. The method according to claim 6, further comprising:
sampling at least a portion of a conversation between said user and at least one other call participant; and
adding said sampling to said plurality of voice imprints marked as excluded.

8. The method according to claim 6, further comprising:
sampling at least a portion of a voice mailbox greeting; and
adding said sampling to said plurality of voice imprints marked as permitted.

9. The method according to claim 6, further comprising:
responsive to detecting a selection by said user to delete a particular voice mail message from among said plurality of voice mail message entries because said particular voice mail message is unwanted by said particular user, adding a sampling of said voice mail message to said plurality of voice imprints marked as excluded.

10. A system for managing entries within a voice mailbox for at least one user, comprising:
a voice mailbox for storing a plurality of voice mail message entries for said user;
said voice mailbox further comprising:
means for calculating a separate Bayesian score for each voice mail message from among said plurality of voice mail message entries stored in said voice mailbox, wherein each said separate Bayesian score indicates a probability that each said separate voice mail message is unwanted by said user; and
means, responsive to a user selection during playback to delete entries, for automatically deleting a selection of said plurality of voice mail message entries from said voice mailbox each with said separate Bayesian score greater than a particular Bayesian score of the last played voice mail message from said voice mailbox.

11. The system according to claim 10, said voice mailbox further comprising:
means for sorting said plurality of voice mail messages entries in an order from lowest Bayesian score to highest Bayesian score; and
means for playing said selection of said plurality of voice mail messages entries in said order to said user.

12. The system according to claim 10, said voice mailbox further comprising:
means, responsive to calculating said separate Bayesian score for each said voice mail message, for automatically deleting a second selection from among said plurality of voice mail messages entries each with said separate Bayesian score greater than a particular score threshold.

13. The system according to claim 10, wherein said means for calculating a separate Bayesian score further comprises:
means for calculating each said separate Bayesian score from matching words in each said voice mail message to a separate selection of words from a plurality of words within a corpus, wherein each of said plurality of words within said corpus comprises a probability of occurring in a voice mail and a probability of occurring in a voice mail that is unwanted.

14. The system according to claim 13, said voice mailbox further comprising:

means for adding said plurality of words to said corpus from at least one from among a first selection of words detected within at least one voice mail saved by said user during playback, a second selection of words detected during at least one conversation between said user and at least other participant, and a third selection of words detected within at least one voice mail deleted by said user and marked as unwanted voice mail.

15. The system according to claim 10, said voice mailbox further comprising:
means for detecting whether a separate voice characteristic for each said voice mail message from among said plurality of voice mail message entries matches at least one voice imprint from among a plurality of voice imprints, wherein each of said plurality of voice imprints is marked as one from among permitted or excluded; and
means for automatically deleting a second selection of said plurality of voice mail message entries from said voice mailbox each with said separate voice characteristic matching one from among said plurality of voice imprints marked as excluded.

16. The system according to claim 15, said voice mailbox further comprising:
means for sampling at least a portion of a conversation between said user and at least one other call participant; and
means for adding said sampling to said plurality of voice imprints marked as excluded.

17. The system according to claim 15, said voice mailbox further comprising:
means for sampling at least a portion of a voice mailbox greeting; and
means for adding said sampling to said plurality of voice imprints marked as permitted.

18. The system according to claim 15, said voice mailbox further comprising:
means, responsive to detecting a selection by said user to delete a particular voice mail message from among said plurality of voice mail message entries because said particular voice mail message is unwanted by said particular user, for adding a sampling of said voice mail message to said plurality of voice imprints marked as excluded.

19. The system according to claim 10, wherein at least a selection of said plurality of voice mail message entries are transmitted through a packet switching network using the voice over Internet Protocol.

20. A program for managing entries within a voice mailbox for at least one user, said program embodied in a computer-readable medium, said program comprising computer-executable instructions which cause a computer to perform the steps of:
controlling calculation of a separate Bayesian score for each voice mail message from among a plurality of voice mail message entries received into said voice mailbox for said user, wherein each said separate Bayesian score indicates a probability that each said separate voice mail message is unwanted by said user; and
controlling automatic deletion of a selection of said plurality of voice mail message entries from said voice mailbox each with said separate Bayesian score greater than a particular Bayesian score of the last played voice mail message from said voice mailbox.

* * * * *